April 8, 1969

E. F. COX 3,437,852

OSCILLATING ELECTRIC MOTOR STRUCTURE

Filed March 30, 1966

INVENTOR
Ernest Francis Cox
BY
ATTORNEYS

United States Patent Office 3,437,852
Patented Apr. 8, 1969

3,437,852
OSCILLATING ELECTRIC MOTOR STRUCTURE
Ernest Francis Cox, Ryde, Isle of Wight, England, assignor to Ronson Corporation, Woodbridge, N.J., a corporation of New Jersey
Filed Mar. 30, 1966, Ser. No. 538,755
Claims priority, application Great Britain, Mar. 31, 1965, 13,745/65
Int. Cl. H02k 1/34
U.S. Cl. 310—36    3 Claims

ABSTRACT OF THE DISCLOSURE

Precise and efficient positioning of the stator-armature assembly in the construction of electric razors is accomplished by means of a number of mutually interengaging protuberances and depressions on the stator and frame which accurately positions these parts with respect to each other, thus eliminating the need for individual adjustment of each razor.

---

Figure 1:
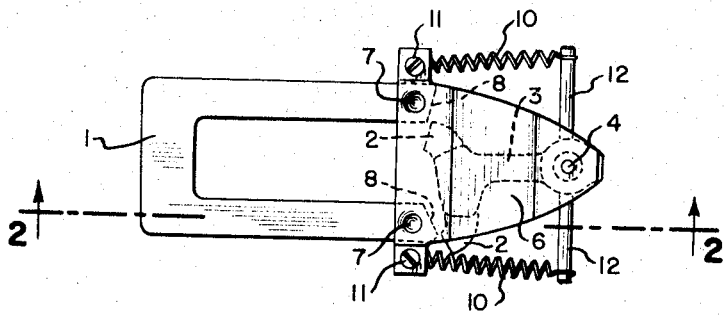

This invention relates to electric razors and more particularly to improvements in the construction and assembly thereof.

In electric razors having a driving motor of the vibratory type, the basic working part is the stator-armature assembly. This assembly comprises a U-shaped stator and a two-membered frame which fits over the open end of the stator. Mounted onto the frame by a pivot pin and precisely positioned with respect to the stator is an armature, which oscillates in a fixed spaced relationship with respect to the stator.

In the assembly of razors of this type an important yet tedious and time consuming operation is the positioning of the armature with respect to the stator. The importance of this operation lies in the fact that the armature must be able to clear the pole faces of the stator during oscillation. Without such clearance the razor would not be able to operate. In addition, the clearance must be quite narrow to effect the proper electromagnetic interaction between the armature and the pole faces of the stator. This assures a smooth oscillation of the armature for proper operation of the razor. Normally this positioning is effected during the assembly of the frame onto the stator and it is a time consuming operation which appreciably adds to the cost of manufacture of the razor. An object of the preset invention is to provide an improved razor construction which will enable the stator-armature assembly to be correctly positioned during construction of the razor without the need for subsequent adjustment.

According to the present invention, the frame and the stator are provided with mutually interengaging positioning means which will precisely locate the position of the stator and the frame with respect to each other. Thus the armature which is secured to the frame by the armature lever describes an arc of oscillation which will be maintained in a predetermined fixed spaced relationship with respect to the stator. The positioning means on the stator and the frame are cooperating elements which when mutually interengaged precisely determine the position of the frame on the stator and hence the location of the pivotal axis of the armature lever in relation to the pole faces of the stator.

It is not only feasible but also good manufacturing procedure to carefully control the dimensions of the armature and armature lever as well as that of the stator and frame. The arrangement of this invention will insure that the dimensions of the gap between the armature and the pole faces of the stator will also be the same in each assembly, and there will thus be no necessity for individual adjustment of each razor. In a razor of the type described, the axis of oscillation is located at the point on the frame to which the armature lever is secured. The arc of oscillation of the armature depends upon the radius of oscillation which is a function of the distance from the axis of oscillation to the farthest point on the armature which describes the arc. The position at which the frame is to be secured to the stator can be precisely predetermined to effect the proper spacial relationship between the armature and the pole faces of the stator. Thus, the need for individual adjustment of each razor during assembly is eliminated. In addition, the razors can be produced to finer tolerances and the problem of quality control in production greatly simplified.

In razors of the type involved herein, springs are utilized to control the movement of the armature. The function of these springs is to work in conjunction with the electro-magnetic force of the stator, which is made of a laminated magnetic material. The springs are tensioned to maintain the armature in a position which is normally out of line with pole faces of the stator. As the magnetic force in the stator-armature circuit peaks, as it will in an A.C. circuit, the armature is pulled into line with the pole faces of the stator. Then as the magnetic force decreases again, the springs pull the armature back to its normally out-of-line position. Thus, an oscillation of the armature is initiated which continues as long as power is applied to the motor.

The tensioning of these springs, therefore, is both a necessary and time consuming operation. The present invention provides an improved razor construction in which the adjustment of the springs during assembly of the razor is eliminated. In the present invention, the armature lever is formed with yokes which extend therefrom transverse to the pivotal axis. The free ends of the yokes are each connected by a tension spring to a respective point on the supporting frame. This arrangement prevents undue flexing of the springs during operation; and if the dimensions of the assembly are made to close tolerances, the springs can be cut to a standard length, thus avoiding the need for further adjustment.

Figure 2:
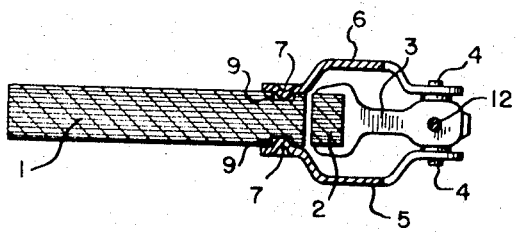
Figure 3:
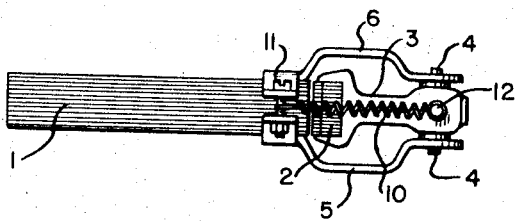

A form of a vibrating motor for an electric razor which embodies the improved construction of the present invention is illustrated in the accompanying drawings in which:

FIG. 1 is a diagrammatic side elevation,
FIG. 2 is a section taken on the line 2—2 of FIG. 1, and
FIG. 3 is an end elevation.

As shown in the drawings, the stator-armature assembly comprises a laminated stator 1, generally of U-shape, which cooperates with an armature 2 mounted on an armature lever 3, which in turn is mounted on a pivot pin 4. The pivot pin is carried in bearings formed in two similar frame members 5 and 6, which together constitute the supporting frame for the armature and armature lever. As shown, each frame member is provided with two protuberances 7 which are precisely located with respect to the axis of the pivot pin 4. The stator is formed with holes or depressions 9 which are also precisely located with respect to the pole faces 8 of the stator which are of such size as to receive and locate the protuberances 7.

In assembling the motor, the supporting frame, comprising members 5 and 6, with the armature lever 3 pivotally mounted therein, is applied to the stator 1 so that the protuberances 7 engage depressions 9 in the stator. The frame is then secured to the stator by locking means which are comprised of bolts 11. In this manner the armature 2 is precisely located in relation to pole faces 8 and no adjustment of the gap is required after the frame has been assembled on the stator. The arc of oscillation which the armature 2 will describe during its operation, is a function of the distance from the armature to the axis of oscillation 4. The width of the gap between the pole faces 8 of the stator and the arc of oscillation of the armature depends upon the radius of oscillation about pivot pin 4. If the distance from the armature to the pivot pin is kept constant, as will be the case if the manufacture of these parts is carefully controlled, the width of the gap will depend directly on the location of the pivot pin 4 with respect to the stator. In effect, therefore, the interengaging positioning means on the stator and frame members precisely determine the width of the gap between the armature and the pole faces. Thus, the need for individually adjusting this gap on each razor is eliminated.

The armature lever 3 is provided with yokes 12 which extend at right angles to the pivotal axis of the armature lever and generally at right angles to the length of the armature lever. The free ends of these yokes are each connected to one end of the spring 10, the other end of which is hooked around bolt 11. Since the dimensions of the various parts are closely controlled during manufacture, and in view of the positive location of the supporting frame on the stator, it is only necessary to insure that the two springs 10 are cut to a standard length. No further adjustment will be required after they have been assembled. The arrangement and disposition of the springs is also such that during operation, they are not unduly flexed and accordingly they will have a long life and will operate in a reliable manner.

The present invention provides a practical and economically valuable mechanism for the construction and assembly of mechanical shavers. Although the preferred embodiment of the invention has been described, it is to be understood that various modifications thereto may be made without departing from the scope of the invention as set forth in the following claims.

I claim:

1. In an electric razor having a driving motor of the vibrating type, a stator-armature assembly comprising:

(a) a stator having a pair of pole faces,
 (b) an oscillatory armature,
 (c) a frame adapted to be attached to said stator and having a portion thereof extending beyond said stator pole faces.
 (d) means for mounting said armature in said frame for oscillation about an axis,
 (e) interengaging positioning means on said stator and said frame prepositioned in relation to each other such that, when said positioning means on said frame is engaged with said positioning means on said stator, the frame and stator assume a relation to each other such that said axis of oscillation of said armature is at a predetermined distance and position with respect to said stator pole faces,
 (f) means for locking said stator and frame together with said positioning means interengaged,
 (g) yokes attached to said armature at the axis of oscillation and extending at right angles to the length of the armature member, and
 (h) springs connected at one end to said yokes and at the other end to said locking means.

2. Apparatus according to claim 1 in which said interengaging positioning means comprises a number of protuberances greater than two and an equal number of depressions.

3. Apparatus according to claim 1 in which said interengaging positioning means comprises four protuberances and four depressions.

References Cited

UNITED STATES PATENTS 2,827,578   3/1958   Carissimi et al. _____ 310—38

MILTON O. HIRSHFIELD, *Primary Examiner.*

D. F. DUGGAN, *Assistant Examiner.*

U.S. Cl. X.R.

30—43.92